April 24, 1928.
G. E. MILLER ET AL
1,666,972
MOTOR POWER TAKE-OFF
Filed Feb. 21, 1927
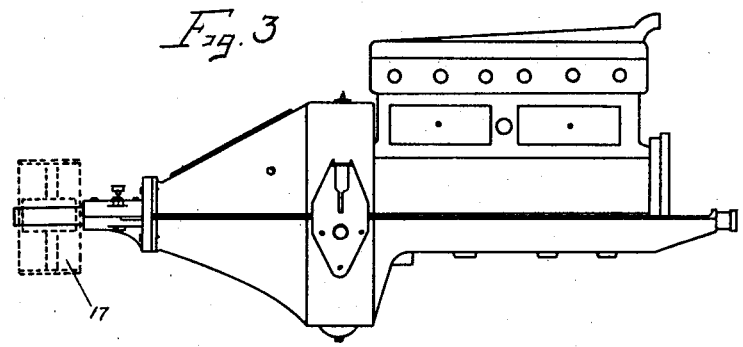
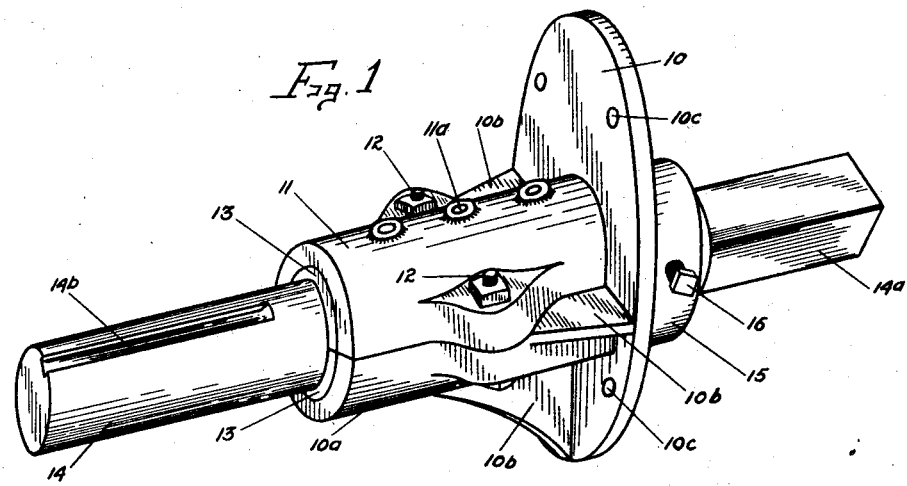
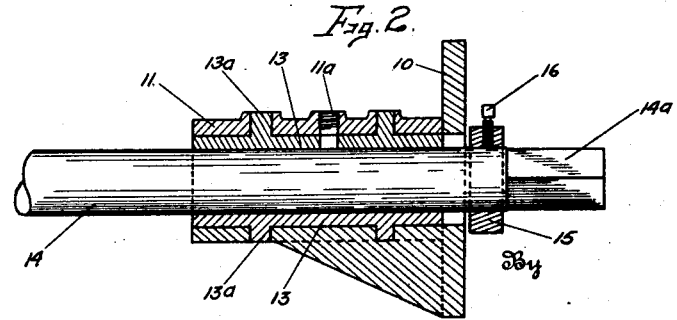
Inventors
G. E. MILLER.
O. E. MILLER
By Emil F. Lange
Attorney Patented Apr. 24, 1928.

1,666,972

UNITED STATES PATENT OFFICE.

GUSTAF E. MILLER AND OSCAR E. MILLER, OF STRATTON, NEBRASKA.

MOTOR POWER TAKE-OFF.

Application filed February 21, 1927. Serial No. 170,065.

Our invention relates to devices for utilizing automobile engines to supply power for operating machinery of the kinds usually found on farms and in small factories. It has for its object the provision of a device of extreme simplicity of construction and operation which may be easily secured to an automobile motor for converting the motor into a power plant.

Having in view these objects and others which will be pointed out in the following description, we will now refer to the drawings, in which Figure 1 is a view in perspective of our power take-off.

Figure 2 is a transverse sectional view of the power take-off.

Figure 3 is a view in side elevation of the motor with our power take-off attached thereto.

The specific embodiment of the invention, as shown in our drawings and as hereinafter described, is designed specifically for converting old Ford engines into power plants.

The device consists of a shaft and support which is adapted to be secured to the engine. The support consists of two parts 10 and 11. The part 10 includes a circular disc which is integral with a semicylindrical member 10ª connected to the disc by means of a web 10ᵇ. The disc portion of the part 10 takes the place of the universal joint of the engine and it must therefore have diameter of the size appropriate for the purpose. The apertures 10ᶜ are positioned to register with the apertures on the engine through which the universal joint is secured to the engine. The purpose is to provide an attachment which may be secured to the engine in the place of the universal joint and by means of the same bolts which normally hold the universal joint in place.

The second member 11 of the bearing support is merely a semicylindrical member having laterally projecting ears with apertures whereby it may be secured by means of bolts 12 to the member 10, the lateral webs 10ᵇ being also apertured for receiving these bolts. The bearing consists of two identical parts 13, each having radial lugs 13ª for entering appropriate sockets in the parts 10 and 11 of the supporting member. The shaft 14 is passed through the bearing 13 in the manner shown in Figure 2. For preventing outward sliding movements of the shaft there is provided a collar 15 having a set screw 16 for securing it on a place on the shaft. The inner end portion of the shaft is in square form at 14ª to enter the square socket of the engine.

In use, the Ford engine, whether old or new, may be left in the chassis or removed therefrom and bolted on a fixed platform. The platform may be either portable or stationary. The universal joint is removed and the disc portion 10 is secured to the engine by means of the same bolts which were used for holding the universal joint. The portion 14ª is seated in the socket of the shaft while the collar 15 is positioned in the universal joint housing. A grease cup of the usual type is then inserted in the socket 11ª and a pulley 17 is secured to the shaft 14 in the keyway 14ᵇ. By then using the pulley 17 as a belt pulley any of the usual stationary farm machinery may be driven by the engine.

The invention is particularly applicable to use with old Ford engines. In every community there are many Ford cars which are worn out so as to be practically useless but the engine is still effective. Such cars may be purchased by farmers and others at prices far below the cost of a new or even a second-hand stationary engine. The Ford engine of even a worn-out Ford automobile is far superior to many new stationary engines since it has four cylinders and a quality of fittings which are usually not found in stationary engines.

The device as above described has been on the market but a very short time but in that time it has gone into rather extensive use. The Ford engines of worn-out automobiles are admirably adapted for doing much of the work on the farm and in small factories. Our power take-off is especially adapted for converting such engines into power plants for driving circular saws, feed grinders, grain elevators, corn shellers, washing machines, churns, and separators, in fact for driving nearly all of the machinery found on the farm and about the house.

Having thus described our invention in such full, clear, and exact terms that its construction and operation will be readily understood by others skilled in the art to which it pertains, what we claim as new and desire to secure by Letters Patent of the United States is:

A motor power take off which is adapted to be secured to an automobile engine in the place of the universal joint, said power take off including a shaft and a support therefor, said support including two parts, one of said two parts comprising a semi-cylindrical part and a circular disc, said circular disc being provided with apertures for securing said take off to the engine in the place of the universal joint, the other of said two parts being semi-cylindrical and having means for securing it to the semi-cylindrical portion of said first described part, bearings between said semi-cylindrical members, said shaft passing through said bearings and having its inner end portion in square form, an adjustable collar surrounding said shaft adjacent said square portion, and a set screw for securing said collar to said shaft.

In testimony whereof we affix our signatures.

GUSTAF E. MILLER
OSCAR E. MILLER.